United States Patent
Gandhi et al.

(10) Patent No.: US 9,619,401 B2
(45) Date of Patent: Apr. 11, 2017

(54) EFFICIENT MEMORY MANAGEMENT SYSTEM FOR COMPUTERS SUPPORTING VIRTUAL MACHINES

(71) Applicant: Wisconsin Alumni Research Foundation, Madison, WI (US)

(72) Inventors: Jayneel Gandhi, Madison, WI (US); Mark D Hill, Madison, WI (US); Michael M Swift, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 47 days.

(21) Appl. No.: 14/627,472

(22) Filed: Feb. 20, 2015

(65) Prior Publication Data

US 2016/0246730 A1    Aug. 25, 2016

(51) Int. Cl.
*G06F 9/26* (2006.01)
*G06F 9/34* (2006.01)
*G06F 12/00* (2006.01)
*G06F 12/1009* (2016.01)
*G06F 12/02* (2006.01)

(52) U.S. Cl.
CPC ...... *G06F 12/1009* (2013.01); *G06F 12/0292* (2013.01); *G06F 2212/152* (2013.01); *G06F 2212/657* (2013.01)

(58) Field of Classification Search
CPC ........ G06F 9/455; G06F 9/50; G06F 12/0246; G06F 12/0284; G06F 12/0292; G06F 12/10; G06F 12/1009; G06F 12/1018; G06F 12/1027; G06F 12/1036; G06F 12/1045; G06F 12/1054; G06F 12/1063; G06F 12/1072; G06F 12/71081; G06F 12/109; G06F 2212/1016; G06F 2212/1021; G06F 2212/1024; G06F 2212/1041; G06F 2212/1044; G06F 2212/15; G06F 2212/151; G06F 2212/152; G06F 2212/154; G06F 2212/65; G06F 2212/651; G06F 2212/652;

(Continued)

(56) References Cited

U.S. PATENT DOCUMENTS 6,233,668 B1 * 5/2001 Harvey ............... G06F 12/1009
                                                    711/147
7,334,076 B2 * 2/2008 Hendel ................... G06F 9/544
                                                    711/147

(Continued)

OTHER PUBLICATIONS

Agile Paging: Exceeding the Best of Nested and Shadow Paging; Gandhi et al; 2016 ACM/IEEE 43rd Annual International Symposium on Computer Architecture (ISCA); Jun. 18-22, 2016; pp. 707-718 (12 pages).*

(Continued)

*Primary Examiner* — Daniel C Chappell
(74) *Attorney, Agent, or Firm* — Boyle Fredrickson, S.C.

(57) ABSTRACT

The translation of virtual guest addresses to host physical addresses in a virtualized computer system provides a compound page table that may simultaneously support nested-paging and shadow-paging for different memory regions. Memory regions with stable address mapping, for example, holding program code, may be treated using shadow-paging while memory regions with dynamic address mapping, for example, variable storage, may be treated using nested-paging thereby obtaining the benefits of both techniques.

15 Claims, 5 Drawing Sheets

(58) Field of Classification Search
CPC ......... G06F 2212/653; G06F 2212/654; G06F 2212/655; G06F 2212/656; G06F 2212/657
USPC .................................................. 711/206
See application file for complete search history.

(56) References Cited

U.S. PATENT DOCUMENTS

| | | | | |
|---|---|---|---|---|
| 7,886,126 B2* | 2/2011 | Bennett | ............... | G06F 9/45533 711/2 |
| 8,024,546 B2* | 9/2011 | Foltz | ................... | G06F 12/1009 711/206 |
| 8,078,827 B2* | 12/2011 | Uhlig | ................... | G06F 12/109 711/202 |
| 8,386,745 B2* | 2/2013 | Kegel | ..................... | G06F 12/10 711/205 |
| 8,402,238 B2* | 3/2013 | Saito | ..................... | G06F 3/0613 711/112 |
| 8,738,860 B1* | 5/2014 | Griffin | ................. | G06F 12/0897 711/122 |
| 8,996,814 B2* | 3/2015 | Peinado | ................ | G06F 12/126 711/133 |
| 9,063,866 B1* | 6/2015 | Tati | ......................... | G06F 12/10 |
| 9,098,427 B2* | 8/2015 | Liu | ..................... | G06F 12/1009 |
| 9,152,570 B2* | 10/2015 | Mehta | ................. | G06F 12/1027 |
| 9,213,649 B2* | 12/2015 | Koka | ................... | G06F 12/1009 |
| 9,330,015 B2* | 5/2016 | Baskakov | ............ | G06F 12/1009 |
| 9,501,422 B2* | 11/2016 | Baskakov | ............ | G06F 12/1009 |
| 2006/0070065 A1* | 3/2006 | Zimmer | ................. | G06F 9/5016 718/1 |
| 2014/0108701 A1* | 4/2014 | Liljeberg | ............ | G06F 12/1441 711/6 |
| 2014/0380009 A1* | 12/2014 | Lemay | ................... | G06F 12/145 711/163 |
| 2015/0067296 A1* | 3/2015 | Basu | ................... | G06F 12/1009 711/206 |

OTHER PUBLICATIONS

On a Model of Virtual Address Translation; Jurkiewicz et al; Journal of Experimental Algorithmics, vol. 19, article No. 1.9; 2014 (28 pages).*

Jahneel Gandhi et al.; "Efficient Memory Virtualization."; Proceedings of the 47th Annual IEEE/ACM International Symposium on Microarchitecture; pp. 178-189, IEEE Computer Society Washington, DC, USA; 2014.

Wang et al., "Selective hardware/software memory virtualization.", Proceedings of the 7th ACM SIGPLAN/SIGOPS international conference on Virtual execution environments; pp. 217-226; ACM New York, NY, USA; 2011.

* cited by examiner

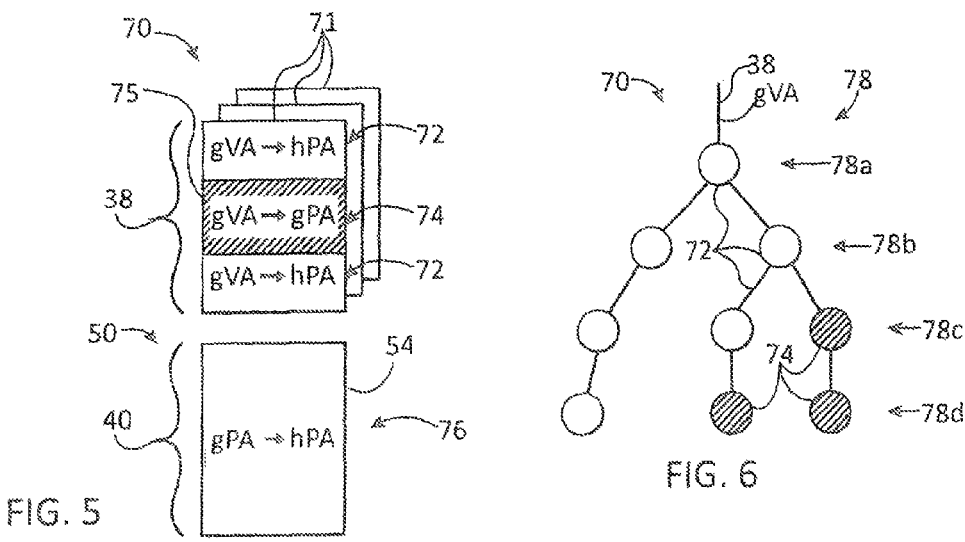
FIG. 5
FIG. 6
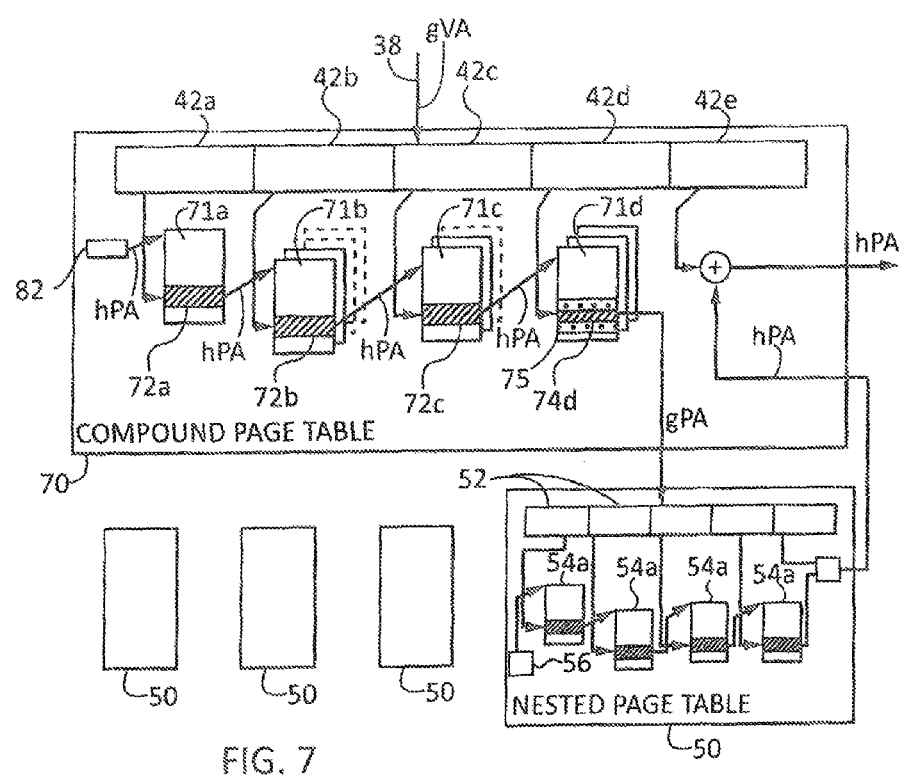
FIG. 7

EFFICIENT MEMORY MANAGEMENT SYSTEM FOR COMPUTERS SUPPORTING VIRTUAL MACHINES

STATEMENT REGARDING FEDERALLY SPONSORED RESEARCH OR DEVELOPMENT

This invention was made with government support under 1302260 and 1218323 awarded by the National Science Foundation. The government has certain rights in the invention.

CROSS REFERENCE TO RELATED APPLICATION

Not Applicable

BACKGROUND OF THE INVENTION

The present invention relates to electronic computer architectures and in particular to memory management circuitry providing improved address translation for virtualizing computer systems.

Computer memory system stores electronic representations of data at physical addresses unique and intrinsic to the location of the data. When a program executing on a computer needs to access (read or write) data, it computes and provides to the memory system the physical address of the needed data. The memory uses this physical address to electrically connect to the proper memory location for reading or writing.

Current computer systems may execute multiple programs (processes) using an address translation system which may present to each process a separate, "virtual" memory address space. Each different virtual address space may appear to exist as an identical continuous block of memory and is largely independent of the actual physical memory of the computer. The address translation system (being a combination of specialized hardware and data structures managed by the operating system) positions itself between the executing processes and the physical memory to receive virtual addresses of the virtual address memory space from the processes and to map those virtual addresses to actual physical addresses of the physical memory, the latter which then provides access to the desired data.

This use of virtual memory addresses has several advantages. First, it frees the processes from needing to navigate and manage a shared physical memory space. It also prevents interference between different processes that might overwrite each other's data by segregating each process within a different virtual memory space. Virtual memory addresses also allow the individual processes to execute as if they have more memory than is actually physically available by multiplexing physical memory among multiple virtual address spaces at different times.

The use of virtual memory requires a translation step for each memory access during which a virtual address is translated to a physical address. This translation step can consume substantial memory resources (for holding the translation information) and can slow the speed of execution of a process through the time required to complete the translation.

The amount of memory needed to hold the translation information can be reduced by placing the translation information in a hierarchical page table where initial levels (nodes) of page table receive higher ordered memory addresses and then point to lower levels of page table that decode successively lower orders of memory address. This hierarchy reduces the number of page table entries to less than would otherwise be required if a single entry were recorded for each virtual/physical address translation pair, but at the expense of increasing the number of times that memory needs to be accessed to fully decode a given virtual address. For example, a four-level hierarchical page table would require four separate memory accesses for each virtual memory address translation.

The multiple necessary memory accesses may be greatly reduced by caching recent translation pairs in a "translation lookaside buffer" (TLB). If a translation pair is in the TLB, references to the page table and thus multiple memory accesses can be bypassed.

The concept of virtual memory becomes more complicated under so-called "virtualized" systems in which the processes are managed by multiple "guest" operating systems in turn executed under a "hypervisor or a virtual machine monitor (VMM)". This use of "virtualization" refers to the fact that each guest operating system appears to operate on a different virtual machine. In virtualization, the guest operating systems may also provide their processes with a virtual address space having a guest of virtual addresses (gVA). Generally, the hypervisor or VMM may be executed natively without the need for a hosting operating system or may be hosted by a hosting operating system. For simplicity, in the context of virtualization, the software implementing the virtualization in either of these cases will be termed a "host operating system" whether it is a hypervisor or VMM alone or a hypervisor or VMM in combination with a hosting operating system.

Using a technique called "nested-paging", each guest operating system may receive gVA values from its processes and transform them into a guest physical address (gPA) using "guest page tables" in a manner analogous to the translation between virtual and physical addresses performed by a single operating system. The host operating system then translates the gPA addresses into a host physical address (hPA) space using a nested page table. Programs executed natively by the host operating system (including the execution of the guest operating systems) may communicate with physical memory through a single layer of translation using what will be termed "native page tables" translating between the host virtual addresses and the hPA.

Nested-paging used for address translation scales nonlinearly with each layer of virtualization. For example, if four memory accesses are required by the nested page table and four memory accesses are required by the guest page table, twenty-four memory accesses can be required for a two-step translation between gVAs and hPAs. A more detailed example will be provided below.

The number of memory accesses needed in virtualized operating systems may be reduced by combining the guest page table and nested page table into a single "shadow-page table" using a scheme termed "shadow-paging". The page table of the shadow-page table provide entries that directly map gVAs to hPAs. While shadow-paging reduce the number of memory accesses required for the translation process, they require time-consuming updates to the shadow-pages from the underlying guest page tables and nested page tables when the latter are changed. That is, the shadow-page tables must constantly shadow their counterparts. Normally this updating requires significant processor resources that could otherwise be devoted to the execution of programs and thus can offset some of the benefits of shadow-paging over nested-paging.

SUMMARY OF THE INVENTION

The present invention provides a "compound page table" system that blends features of shadow-paging and nested-paging, selecting between these features as a function of memory address. When the mapping between gVAs and hPAs is stable for a particular address range, the compound page tables provide a system that operates like shadow-paging. Conversely, when mapping between gVAs and hPAs is dynamic for that memory address range, the compound page table provides a system that operates like nested-paging. Generally, given mapping over multiple address ranges combines both shadow-paging and nested-paging features.

In one embodiment, the compound page table itself is used to demarcate the regions in which "shadow-type" and "nested-type" operation will be employed. This allows shadow-type and nested-type operation to be deployed with an arbitrary granularity without the need for separate, ancillary data structures.

Specifically, in one embodiment, the invention provides a virtualizing electronic computer of the type having a processor communicating with an electronic memory system holding data stored at physical addresses and storing programs including: at least one instance of a guest operating system, a process executing under the guest operating system, and a host operating system. The computer may operate to store page tables having first page table entries translating a guest virtual address into a host physical address, and also having second page table entries translating a guest virtual address into a guest physical address; and further having third page table entries translating a guest physical address into a host physical address.

The computer further provides a memory management system receiving memory access requests from the processor and, when the request provides a guest virtual address, accessing a page table to determine an entry associated with an address of the request. When the entry is a first page table entry, the memory management system uses the first page table entry to translate the guest virtual address into a host physical address used for accessing memory. On the other hand, when the entry is a second page table entry, the memory management system first uses the second page table entry to translate the guest virtual address into a guest physical address and second accesses a third page table entry to translate the guest physical address into a host physical address used for accessing memory.

It is thus a feature of at least one embodiment of the invention to permit the tailoring of the translation of memory addresses to either shadow-paging or nested-paging type access depending on particular memory regions being accessed.

The first page table entries and the second page table entries may be collected in a compound page table spanning a complete range of the guest virtual addresses, and the third page table entries may be collected in a nested page table spanning a complete range of the guest physical addresses.

It is thus a feature of at least one embodiment of the invention to present a single page table for the guest virtual address space translations.

Requests received from the guest operating system may be processed by the compound page table whereas requests received from the host operating system may be processed by the host page table.

It is thus a feature of at least one embodiment of the invention to efficiently steer memory access requests from the guest operating system to the appropriate page table structure according to request origin.

Each access to an entry of the compound page table may require a single memory reference and each access to an entry of the host page table may require a single memory reference.

It is thus a feature of at least one embodiment of the invention to recognize the cost of memory references and to minimize memory references for virtualization using both shadow-paging and nested-paging.

The accessed page table may hold both first and second entries arranged by request addresses.

It is thus a feature of at least one embodiment of the invention to use the page table holding the first and second entries as the mechanism for selecting among first and second entries without the need for ancillary structure.

It is thus a feature of at least one embodiment of the invention to eliminate an extra step that would be required by a separate process of selecting between a shadow-paging or nested-paging mode and obtaining the necessary data to perform the shadow-paging or nested-paging.

An operating system may allocate translation information between the first page table entries and second page table entries according to an anticipated rate of change to the translation information.

It is thus a feature of at least one embodiment of the invention to apply shadow-paging and nested-paging to the memory regions most likely to benefit from these particular translation techniques. That is, to use nested-paging when constant changes to the page tables would make shadow-paging cumbersome and otherwise to use shadow-paging to minimize cost of memory references.

An operating system (either the host or guest operating system or closely allied program such as a compiler communicating with an operating system) may allocate translation information to the first page table entries for data describing program instructions and/or may allocate translation information to the second page table entries for data describing program data operated on by the program instructions.

It is thus a feature of at least one embodiment of the invention to permit pre-allocation of the translation modes to particular memory regions based on an ex ante expectation about the rate of change of translation information for those regions. Generally program instructions would be expected to remain relatively stable with respect to their physical memory addresses compared to program data on a heap or the like. This allocation system permits allocation to be informed by the programmer or compiler or the like wherein the programmer or compiler may provide instructions implemented by the operating system describing the allocation of translation modes to different memory regions.

Alternatively or in addition, an operating system may monitor, during runtime, a change in a mapping between guest virtual addresses and guest physical addresses, and/or guest physical addresses and host physical addresses to dynamically change whether the translation information for a given guest virtual address is held in the first page table entries or second page table entries.

It is thus a feature of at least one embodiment of the invention to permit the runtime tailoring of shadow-paging and nested-paging to different memory regions based on observed program behavior as possibly influenced by other programs concurrently executing.

An operating system may default to use of the first page table entries for virtual guest addresses at the beginning of execution of a process.

It is thus a feature of at least one embodiment of the invention to capture the translation speed benefits of shadow-paging before necessary profiling data has been obtained.

The page table entries may be arranged in a hierarchy of levels where entries of higher levels decode higher significant bits of a guest virtual address and entries of lower levels decode lower significant bits of the guest virtual address, and wherein first page table entries and second page table entries simultaneously exist in a given level.

It is thus a feature of at least one embodiment of the invention to provide a system that works with hierarchical page tables for reduced memory usage.

The second page table entries at a level may be followed in the hierarchy by only second page table entries at lower levels; however, first page table entries at a level may be followed by both first page table entries and second page table entries at lower levels.

It is thus a feature of at least one embodiment of the invention to provide a mapping system that comports with an expectation that higher ordered addresses tend to have more stable translation than lower ordered addresses.

These particular objects and advantages may apply to only some embodiments falling within the claims and thus do not define the scope of the invention.

BRIEF DESCRIPTION OF THE DRAWINGS

FIG. 5 is a logical depiction of a compound page table and host page table used by the present invention showing a simplified division of the compound page table into entries associated with each of these different shadow-paging and nested-paging translation modes;

FIG. 6 is a tree depiction of a hierarchy of page table entries in the compound page table showing movement between nested-paging and shadow-paging translation modes possible with the present invention;

FIG. 7 is a figure similar to that of FIGS. 5 and 6 showing the operation of a compound page table and host page table per the present invention;

DETAILED DESCRIPTION OF THE PREFERRED EMBODIMENT

Figure 1:
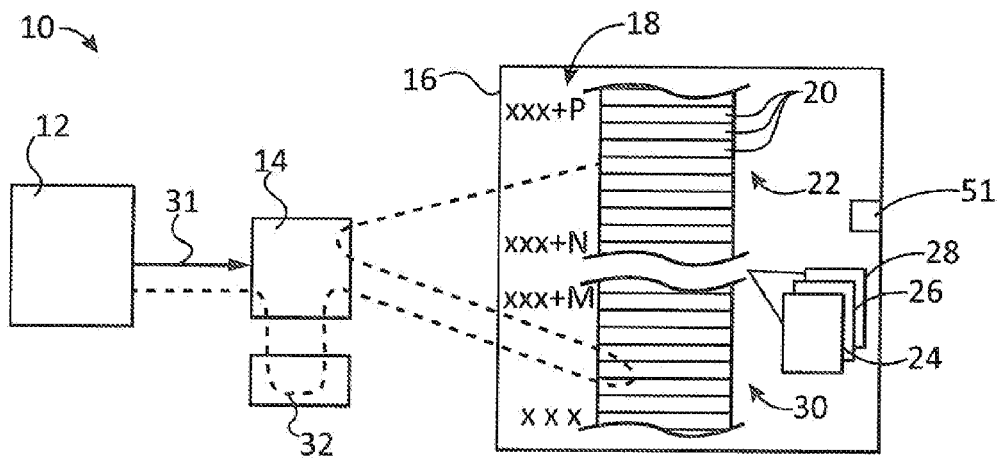
FIG. 1 is a simplified block diagram of a processor communicating with memory through a memory interface providing memory address translations.

Referring now to FIG. 1, a computer system 10 for use with the present invention may provide, one or more processors 12 communicating through a memory management unit 14 with a main memory 16. The main memory 16 may comprise physical memory using a variety of different technologies including dynamic random access memory, disk drive memory, flash memory and the like but will be characterized in presenting a set of physical addresses 18 uniquely identifying storage locations 20 in which data may be stored.

The memory 16 may include addresses 22 related to data and program storage, these addresses, in this example, holding: a host operating system 24, one or more instances of a guest operating system 26, one or more programs 28 comprised of processes executing under the guest operating system 26 or host operating system 24, as well as general data used by each of these programs 28.

The memory 16 may also provide for a storage area and various page tables 30 as will be discussed below.

During memory access by the processor 12, being either a reading or a writing of data from or to the memory 16, the processor 12 may provide a virtual address on address line 31 to the memory management unit 14 which translates that access address to a physical address 18 to implement the access. As is generally understood in the art, this translation process may use the page tables 30 in memory 16, the page tables 30 containing a mapping from virtual addresses used by the programs 28 executed by the processor 12 to the physical addresses 18. In some cases, page tables 30 may be avoided by consulting a translation lookaside buffer 32 which acts as a cache of recently accessed page table information.

Figure 2:
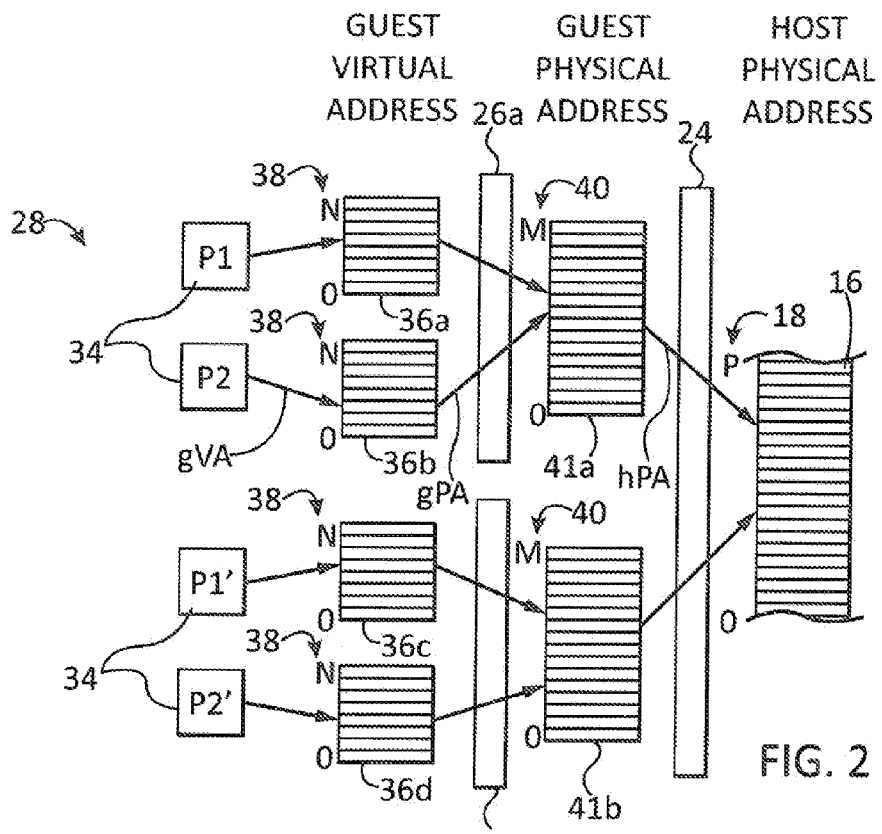
FIG. 2 is a diagram showing address translation in a virtualized computer system having a host operating system and one or more guest operating systems.

Referring to FIG. 2, computer system 10 may be used for virtualization in which different processes 34 of programs 28 may each be presented with a guest virtual address space 36 typically providing identical continuous blocks of guest virtual addresses (gVAs 38). For example, processes P1 and P2 may interact with guests virtual address spaces 36a and 36b managed by guest operating system 26a, and processes P1' and P2' may interact with guest virtual address spaces 36c and 36d managed by guest operating system 26b.

Generally, the guest operating systems 26, possibly with some hardware assistance, will translate the gVAs 38 into guest physical addresses (gPAs 40) of a corresponding guest physical address space 41. Specifically, the guest operating system 26a will translate guest virtual address spaces 36a and 36b to guest physical address space 41a, whereas guest operating system 26b will translate guest virtual address spaces 36c and 36d into guest physical address space 41b.

Overlap between the mappings from gVAs 38 to gPAs 40 is permissible for the purpose of memory sharing or the gVAs 38 may be wholly disjoint.

Figure 3:
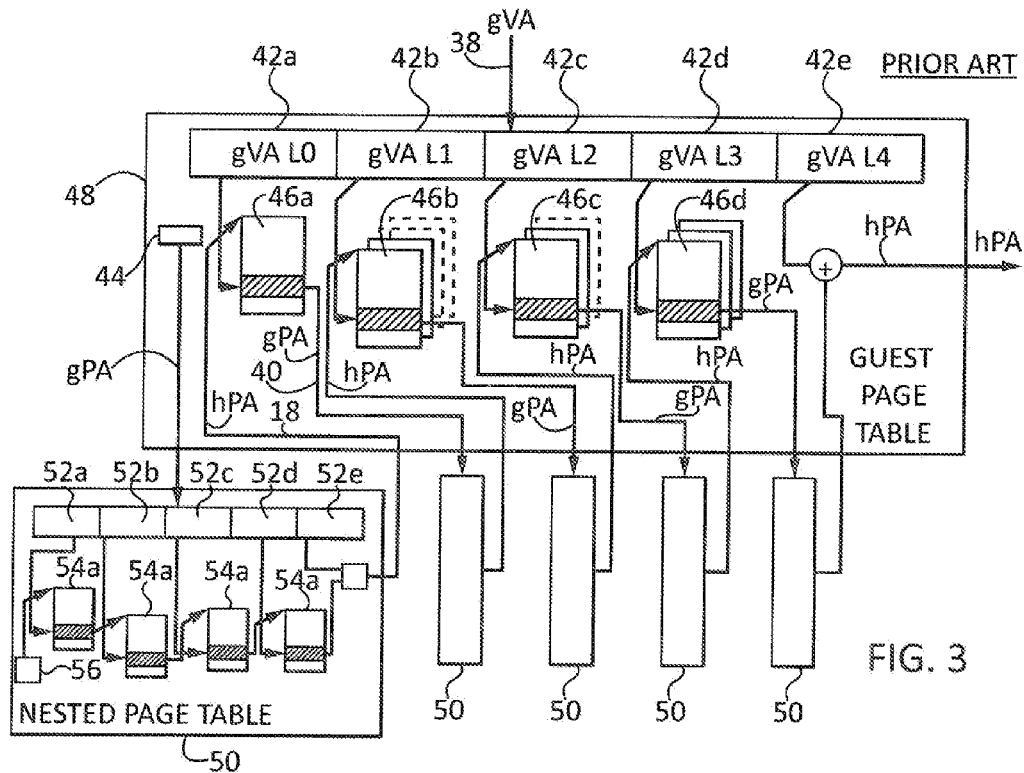
FIG. 3 is a diagram of data flow in a prior art nested-page table translation in a virtualized computer system showing the large number of required memory accesses.
Figure 4:
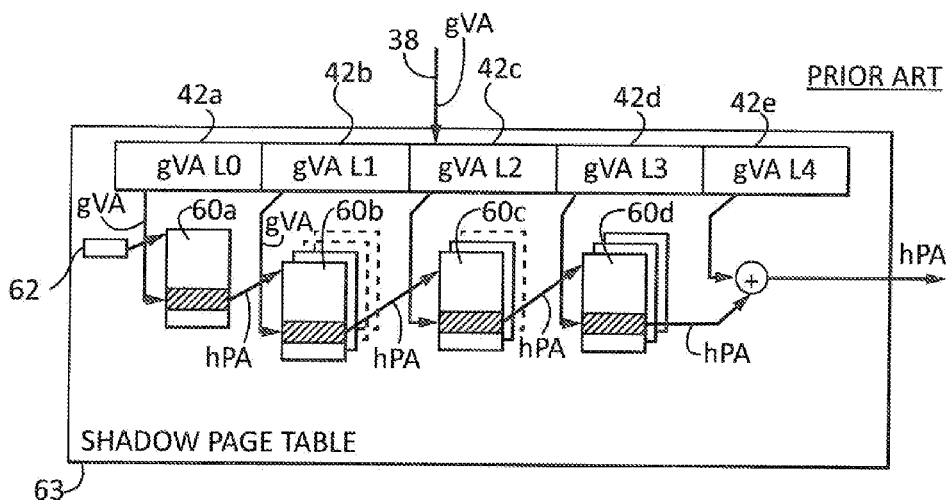
FIG. 4 is a figure similar to FIG. 3 showing a prior art shadow-page table translation in a virtualized computer system providing a lower number of memory accesses.

The gPAs 40 may be mapped to the physical addresses 18 of the physical memory 16 by the virtualizing host operating system 24. For convenience, these physical addresses 18 will now be designated as host physical addresses (hPAs 18). Generally, the guest operating systems 26 and host operating system 24 retain complete freedom to manage their corresponding virtual address spaces and to obtain the benefit thereof. Referring now to FIGS. 3 and 4, the previously mentioned two prior art techniques of managing the translations between gVAs 38, gPAs 40 and hPAs 18, that of nested-paging and shadow-paging, will now be described in more detail as an aid to understanding the present invention. Nested-paging is shown generally in FIG. 3 and shadow-paging is shown generally in FIG. 4 for a 4-level page table as used in x86-64 type processors.

Referring to FIG. 3, in nested-paging, a gVA 38 is received and broken into multibit address fields 42a-42e starting from most significant bits and proceeding to the least significant bits. These address fields 42a-42e define different levels of a hierarchical translation process using page table 30 comprising of a guest page table 48 providing a translation between gVAs 38 and gPAs 40 and nested page table 50 providing a translation between gPA 40 and hPA 18. In this hierarchical translation process, each of these address fields 42 will be processed in sequence using different levels of guest page nodes 46 also arranged in a hierarchy where the upper levels of guest page node 46 are associated with higher ordered address fields 42 and used to identify the lower levels of guest page table associated with lower ordered address fields 42.

At the beginning of the translation process, a root node guest page table 46a for processing address field 42a must be identified within physical memory. This identification is accomplished by a value previously stored in a register 44 typically as a gPAs 40 set by a guest operating system 26. Because value of register 44 is a gPA 40, it must first be translated into an hPA 18 using a nested page table 50.

As with the guest page table 48, the nested page table 50 receives the gPA 40 of the register 44 and breaks it up into address fields 52a-52e to be processed by hierarchal nested page node 54. The root node of nested page table 54a is identified by a register value 56 holding art hPA 18 (set by the host operating system 24) which points to that root of the nested page node 54a directly. The most significant address field 52a is then used to index through the nested page node 54a. The result of this indexing provides a hPA 18 pointing to a lower-level nested page table node 54b that will be used to index with address field 52b. This process continues to successively process fields 52c and 52d finally producing a hPA that points to the root of the root of guest page table 46a.

Now, we can use the multibit field of gVA 42a to index into the root node of the guest page table 46a producing gPA 40 that points to low er-level neck of the guest page table 46b. Again this gPA 40 must be translated into an hPA 18 to identify the lower-level guest page node 46b and this is done by again referring to the nested page table 50 (the same nested page table 50 described before but reproduced for clarity).

The nested page table 50 takes the gPA 40 and translates it into an hPA 18 pointing to lower-level guest page table node 46b by successively processing multiple address fields 52a of the gPA 40 in a manner. At the conclusion of this process, the resulting hPA 18 then provides a pointer lower-level page node 46b This above described process is repeated for each of the address fields 42c and 42d using corresponding page table nodes 46c and 46d. Page node 46d then provides a gPA 40 translated by the nested page table 50 using multiple steps associated with the hierarchical nested page nodes 54a-54d which may be concatenated to the final address field 42e which provides an offset value within the physical address space defined by the previously decoded hPA 18 values to produce the desired final hPA 18 to which the input gVA 38 maps.

It will be appreciated that each access of the guest page node 46 or nested page node 54 requires a separate memory access reference, where one memory access reference is generally one random-access of physical memory 16 through any number of caches or the like. Memory accesses are time-consuming and in this case twenty-four such memory accesses references are required to complete the translation process, substantially more than the four memory accesses references required fix conversion between a virtual address space 38 and host physical memory space of physical memory 16 in a non-virtualized system.

Accordingly and referring to FIG. 4, shadow-paging has been developed in which a set of shadow page nodes 60 in a shadow-page table 63 are used to provide direct conversion from gVAs to hPAs. As before, a gVA 38 defining a desired memory access is broken into address fields 42a-42e. In this case, a register value 62 is pre-decoded into an hPA 18 to directly point to a top-level shadow-page node 60a. Address field 42a is used to index top-level shadow-page nodes 60a which directly provides an hPA 18 pointing to the next shadow-page nodes 60b in the hierarchy as will be used to index with address field 42b. This process continues through shadow-page nodes 60e and 60d for address fields 42c and 42d, ultimately providing an hPA 18 concatenated to an offset of address field 42e to reveal the final hPA 18.

Generally the shadow-page table 63 may coexists with the guest page table 48 and nested page table 50, the latter of which are directly updated by the guest operating system 26 and host operating system 24. The shadow-page table 63 is then updated from the updated guest page table 48 and the nested page table in a separate process. For this reason, the shadow-page table 63 represents a processing and memory access burden whenever the underlying data of the guest page table 48 or nested page table 50 are changed.

With this background, the present invention will now again be described. Referring to FIG. 5, in overview, the present invention provides a compound page table 70 in addition to the nested page table 50. The compound page table 70 accepts as arguments the entire range of gVAs for each guest process. The compound page table 70 includes individual compound page nodes 71 each holding entries that may be divided into shadow-style entries 72 and nested-style entries 74. Each shadow-style entry 72 and nested-style entry 74 provides a single address translation pair, however, the nested-style entry 74 also provide a selector bit 75 indicating they are nested-style entry 74 to the MMU 14 as will be described below. The write access bit in the page table entry may be used as the selector bit 75. A shadow-style entry 72 provides a direct mapping between gVAs 38 and hPAs 18 in the manner of shadow page nodes 60. The nested-style entries 74 provide a mapping between gVAs 38 and gPAs 40 in the manner of the guest page table 48.

The nested page table 50 includes only a nested-type entries 76 mapping gPAs 40 to hPAs 18 per nested page table 50. The memory footprint of the compound page table 70 and nested page table 50 is thus no greater than used in nested-paging of FIG. 3.

In this depiction, a given compound page node 71 may provide three contiguous zones, and within each zone the entry types are identical while among different zones different entry types are held. More generally however, each entry of a given compound page node 71 may have an entry type different from its neighbors. As with the examples of FIGS. 3 and 4, the compound page nodes 71 can be arranged in a hierarchy to translate a gVA 38 broken into multiple address fields 42. Generally some compound page nodes 71 will include both shadow-style entry 72 and nested-style entry 74 while other compound page nodes 71 may include all shadow-style entries 72 or all nested-style entries 74.

Referring momentarily to FIG. 6, and as will be discussed in further detail below, as one moves through the hierarchy 78 of the multiple address fields 42 and compound page nodes 71, individual entries from the various compound page nodes 71 used for the translation process may change from shadow-style entries 72 to nested-style entries 74. As will be understood from the below description, this changing between shadow-style entries 72 to nested-style entries 74 effectively changes the mode of address translation between shadow-paging and nested-paging. Accordingly, by using the entry (as either a shadow-style entry 72 or nested-style entry 74) to define the mode of address translation, it will be appreciated that an address translation mode of shadow or nested may be associated on an address-by-address basis with particular memory addresses allowing optimization of the translation process according to memory location as will be discussed below. It will be noted that typically progressive entries will only change from shadow-style entries 72 to nested-style entry 74 as one moves downward through the hierarchy 78 and not vice versa; however, the invention contemplates that both directions of changing between shadow-paging and nested-paging may be employed as one moves down through the hierarchy 78.

Referring now to FIG. 7 the compound page table 70 may receive a gVA 38 describing a desired memory access, and that address may be again divided into fields 42a-42e. A register 82 holding an hPA 18 points to root compound page node 71a that will be used to index with the first field 42a. In this example, the first field 42a indexes to a shadow-style entry 72a in the compound page node 71a providing a shadow-style entry 72. More generally, this entry may be either a shadow-style entry 72 or a nested-style entry 74. When the entry is a shadow-type entry 72, per this example, the value of the shadow-style entry 72a provides an hPA 18 that points directly to the next compound page node 71b in the compound page table 70.

This process proceeds generally through each of the fields 42 in a similar manner. At any compound page node 71, however, the entry may change from a shadow-style entry 72 to a nested-style entry 74. In this example, at compound page table node 74d, we use the field 42d to index to a nested-style entry 74d. This nested-style entry 74d, unlike the previous shadow-style entries 72a-72c, provides a gPA 40 rather than an hPA 18 and thus must be decoded by the nested page node 54. After processing by the nested page table 50, for example, in the manner described above with respect to FIG. 3, an hPA 18 is returned which is routed back to the compound page table 70 to be combined with the offset of address field 42e to provide the resulting hPA 18 for accessing physical memory 16.

It will be appreciated if at compound page node 71d, the address field 42d pointed to a shadow-style entry 72, that output hPA 18 instead may have been directly concatenated with the offset of address field 42e without reference to the nested page table 50.

Although the system described in FIG. 7 could devolve to an entirely nested-paging process it register 82 pointed to a gPA of the guest page table 48, it is believed that in many cases only the last or final few nodes of the hierarchy of compound page table 70 will hold nested-style entries 74 allowing the bulk of the translation process to be performed efficiently with shadow-paging style translation.

Figure 8:
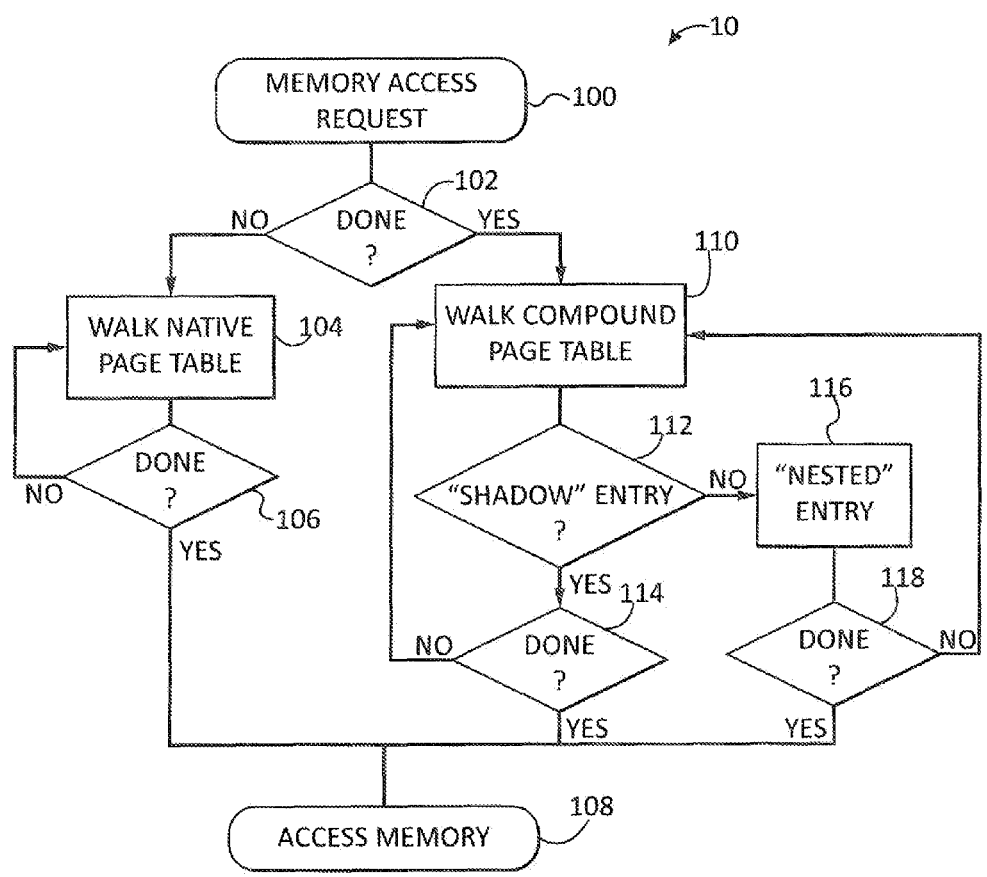
FIG. 8 is a flowchart showing the steps of using the compound page table and host page table according to FIG. 7.

Referring now to FIGS. 2 and 8, in overview, the computer system 10 upon receiving a memory access request per process block 100 may first identify the address of the memory request at decision block 102 as being either from a process 34 managed by the guest operating system 26 (requesting memory using a gVA 38) or being a native process managed only by a hosting operating system of the host operating system 24 (where the hypervisor works with a hosting operating system) requesting memory using a hVA. If the memory request is using a hVA, then that process block 104 a conventional mechanism for translating the hVA into an hPA 18 may be employed, including use of a translate lookaside buffer 32 (shown in FIG. 1) and a walk of a native page table 51 (shown in FIG. 1). Once the walk of the native page table 51 is complete or the entries found in the TLB 32, then at decision block 106 the process completes and the access uses the resulting hPA 1 for memory access of physical memory 16 at process block 108.

If at decision block 102, the address associated with the memory request is a gVA 38, then the computer system 10 moves to process block 110 to begin walking the compound page table 70 as described above. At decision block 112, each entry in a compound page node 71 is checked to see whether it is a shadow-style entry 72 or nested-style entry 74. If the entry is a shadow-style entry 72, and the translation is not complete at decision block 114, computer system 10 loops back to process block 110 to continue the walk of the compound page table 70 using the obtained hPA 18. When at decision block 114 a final level of a compound page node 71 is reached, the program proceeds to process block 108 to access memory using the resulting hPA 18 concatenated to the offset of address field 42e.

If at decision block 112, the entry in a given compound page node 71 is a nested-style entry 74, then the computer system 10 moves to process block 116 to begin walking the nested page table 50 using the output gPA 40. The determination that the given entry is a nested-style entry 74 may be made by a selector bit 75 enrolled in the entry 74 and detectable by the MMU 14. Upon completion of each walk of the nested page table 50, if the translation process is not complete per process block 118, the resulting hPA 18 horn the nested page table 50 is again applied to the compound page table 70 by the computer system 10 looping back to process block 110. Otherwise, at process block 118 the program proceeds to access the data at the resulting hPA 18 again concatenated to the address field 42e per process block 108.

Figure 9:
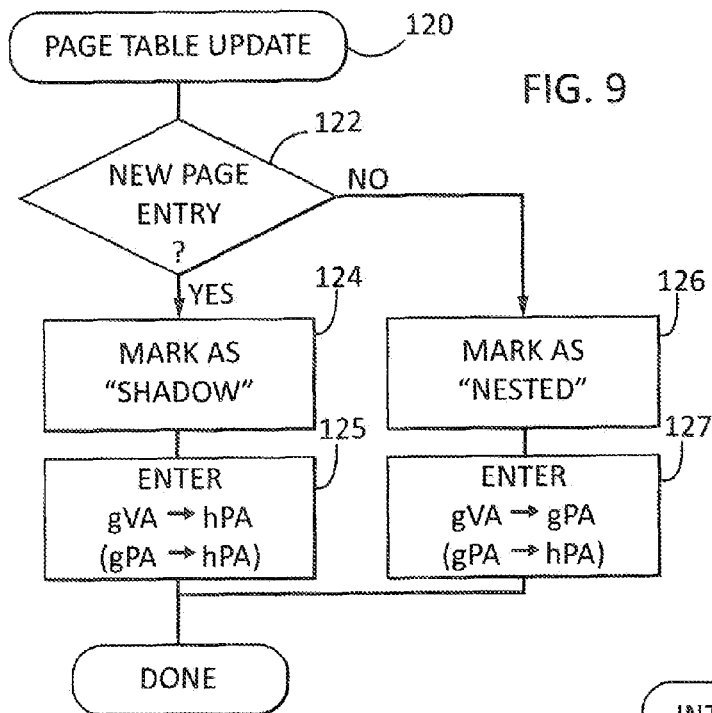
FIG. 9 is a flowchart of depicting the steps of a policy for allocating address space among shadow-paging and nested-paging when page table entries are received.

Referring now to FIG. 9, the above discussion assumes that a determination has previously been made as to whether the entries in a compound page node 71 are shadow-style entry 72 or nested-style entry 74. This determination may be made according to a number of different policies that each produce at least some compound page nodes 71 mixing shadow-style entry 72 and nested-style entry 74.

In one policy, a compiler or programmer operating through the agency of an operating system may designate different memory regions (normally defined as gVAs 38 or ranges of gVAs 38) being associated with shadow-style entry 72 or nested-style entry 74. Generally only the lowest hierarchy of compound page nodes 71 necessary to define the memory region will be modified to include nested-style entries 74 if that memory region is to employ nested-paging. The decision about whether to use shadow-style entries 72 and nested-style entries 74 may be made based on an ex ante determination of the purpose of data the memory region. For example, addresses of guest virtual address space 36 holding "program code", being executable instructions which tend to be relatively stable, may be associated with shadow-style entries 72 to provide for shadow-paging type address translation, while addresses of guest virtual address space 36 holding program data operated on by executable instructions, such as held in variables or a "heap", may be associated with nested-style entry 74 to provide for nested-paging.

Alternatively, the invention contemplates that a dynamic policy may be implemented during program runtime which monitors how often shadow-style entries 72 and nested-style entries 74 in the compound page node 71 are changed while the programs 28 are executing. In this approach, when entry in a compound page node 71 or the nested page table 50 is updated by the guest operating system 26 or host operating system 24, as indicated by process block 120, it may be determined whether this update represents a new entry of previously unallocated gVA 38 or gPA 40 at decision block 122.

If the update represents a new entry, then at process block 124, a set of shadow-style entries 72 are created and at process block 125 the appropriate compound page node 71 of the compound page table 70 is populated to provide a direct translation between the gVA 38 and the corresponding hPA 18 so that the translation can be a shadow-paging type translation. Supporting entries are also made in the nested page table 50.

If at decision block 122, however, the update represents a change to previously mapped data, such as suggests an area of memory that is highly dynamic with respect to address translations, the process proceeds to process block 126 and an appropriate nested-style entry 74 is added to the lowest necessary compound page node 71 in the hierarchy of the compound page table 70 and the nested page table 50 is also updated per process block 127.

Figure 10:
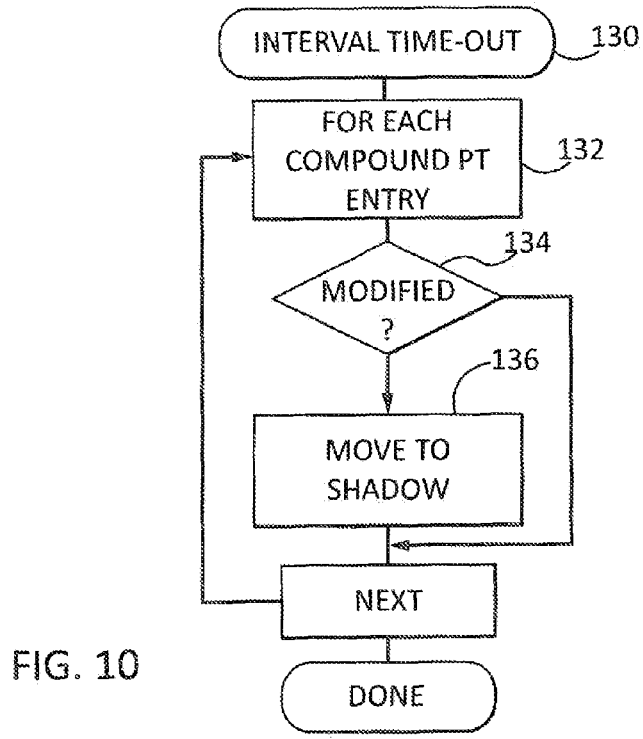
FIG. 10 is a flowchart depicting the steps of reallocating address space according to the policy of FIG. 9 on a regular time interval.

Referring to FIG. 10, at regular intervals, as indicated by process block 130, nested-style entries 74 in the compound page table 70 may be reviewed per loop 132 to determine whether they have been again remapped within a given time window such as would suggest a region of memory with dynamic address translations (for example, a heap or memory swap area). If so, as determined by decision block 134 they remain nested-style entries 74, but if not they are moved back to shadow-paging of shadow-style entry 72 per process block 136. In this way, compound page table 70 may be varied to conform to an arbitrary memory use pattern. This determination may, for example, look at the access/dirty bits associated with the page table entries.

It will be appreciated that the designation of a given entry as either shadow-style entry 72 or nested-style entry 74 may be made by appropriate flag bits designating whether the address of the entry is a gPA 40 or an hPA 18.

It will be appreciated that this invention may be implemented by various combinations of the guest operating system 26, the host operating system 24, and specialized hardware. Most simply the host operating system may trap memory access requests by the processes 34 and handle all memory translation operations making use of a normal or specialized memory management unit. The invention also contemplates specialized hardware for this purpose or modifications of the guest operating, system and host operating system to work in tandem.

The present invention may be applied to page tables of arbitrary size for the translation of address spaces of different dimensions. While an example hierarchical page table system is shown, the invention is equally applicable to hierarchical systems with different numbers of levels and in fact even to non-hierarchical systems. In addition, it will be understood that the invention can be applied to multiple dimensions of virtualization, for example, having guest operating systems that include hypervisors, by simple extension of the herein described principles.

While it is believed that the terms "guest operating system" and "host operating system" will be generally understood to those of ordinary skill in the art as informed by the present specification, invention contemplates that software features of the present invention may be implemented by any program under the control of either operating system and thus claim should not be understood to necessarily be limited to a particular operating system and the operating system should be broadly interpreted to include programs closely communicating with the operating systems.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to a processor can be understood to include one or more processors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A virtualizing electronic computer comprising:
an electronic memory holding data stored at physical addresses and adapted to store programs including at least one instance of a guest operating system, a process executing under the guest operating system, and a host operating system providing virtualization; the electronic memory adapted to store page tables having first page table entries adapted to translate a guest virtual address into a host physical address, second page table entries adapted to translate a guest virtual address into a guest physical address, and third page entries adapted to translate a guest physical address into a host physical address;

at least one processor communicating with the electronic memory for execution of the programs; and a memory management system receiving memory access requests from the processor to:

(1) for a request providing a guest virtual address, determine a page table entry associated with an address of the request;

(2) when the determined entry is a first page table entry, use the first page table entry to translate the guest virtual address into a host physical address used for accessing the electronic memory; and (3) when the determined entry is a second page table entry, use the second page table entry to translate the guest virtual address into a guest physical address and then use a third page table entry to translate the guest physical address into a host physical address used for accessing the electronic memory;

wherein the first page table entries and the second page table entries are collected in a compound page table spanning an entire range of the guest virtual addresses, and the third page table entries are collected in a nested page table spanning a range of the guest physical addresses and wherein there is a unique determined entry in the compound page table for each guest virtual address.

2. The virtualizing electronic computer of claim 1 wherein the host operating system is a hypervisor and hosting operating system, the hypervisor hosted by the hosting operating system.

3. The virtualizing electronic computer of claim 2 wherein the host operating system employs a hypervisor.

4. The virtualizing electronic computer of claim 2 wherein each access to an entry of the compound page table requires a single memory reference, and each access to an entry of the nested page table requires a single memory reference.

5. The virtualizing electronic computer of claim 4 wherein the compound page table holds both first and second entries accessible by request addresses.

6. The virtualizing electronic computer of claim 5 wherein the determination of the entry maps an address of the request to an address of the entry.

7. The virtualizing electronic computer of claim 1 wherein at least one of the guest operating system and the host operating system allocates translation information needed to map from guest virtual addresses to guest physical addresses according to an anticipated rate of change to the translation information.

8. The virtualizing electronic computer of claim 1 wherein at least one of the guest operating system and host operating system allocates translation information needed to map from guest virtual addresses to host physical addresses to the first page table when data associated with the translation information is program instructions.

9. The virtualizing electronic computer of claim 1 wherein at least one of the guest operating system and host operating system allocates translation information needed to map from guest virtual addresses to guest physical addresses to the second page table entries when data associated with the translation information is program data.

10. The virtualizing electronic computer of claim 1 wherein at least one of the guest operating system and host operating system monitors a change in a mapping between guest virtual addresses and guest physical addresses to dynamically change whether translation information for a given guest virtual address is held in the first page table entries or the second page table entries.

11. The virtualizing electronic computer of claim 10 wherein at least one of the guest operating system and host operating system monitors a change in a mapping between guest physical addresses and host physical addresses to dynamically change whether the translation information for a given guest virtual address is held in the first page table entries or the second page table entries.

12. The virtualizing electronic computer of claim 8 wherein at least one of the guest operating system and host operating system defaults to use of the first page table entries for guest virtual addresses at a beginning of execution of a process.

13. The virtualizing electronic computer of claim 1 wherein the page table entries are arranged in a hierarchy of levels where higher levels decode higher significant bits of the guest virtual address and lower levels decode lower significant bits of the guest virtual address, and wherein first page table entries and second page table entries simultaneously exist in a given level and wherein steps (2) and (3) are repeated for portions of the address of the request for each level.

14. The virtualizing electronic computer of claim 13 wherein second page table entries at a level are followed in the hierarchy by only second page table entries at lower levels; however, first page table entries at a level are followed by both first page table entries and second page table entries at lower levels.

15. The virhaalizing electronic computer of claim 1 wherein there is a single unique determined page table entry for each pest virtual address.

\* \* \* \* \*